No. 791,781. PATENTED JUNE 6, 1905.
G. A. HENCKEL.
HOLDER FOR BOTTLES OR OTHER ARTICLES.
APPLICATION FILED FEB. 14, 1905.
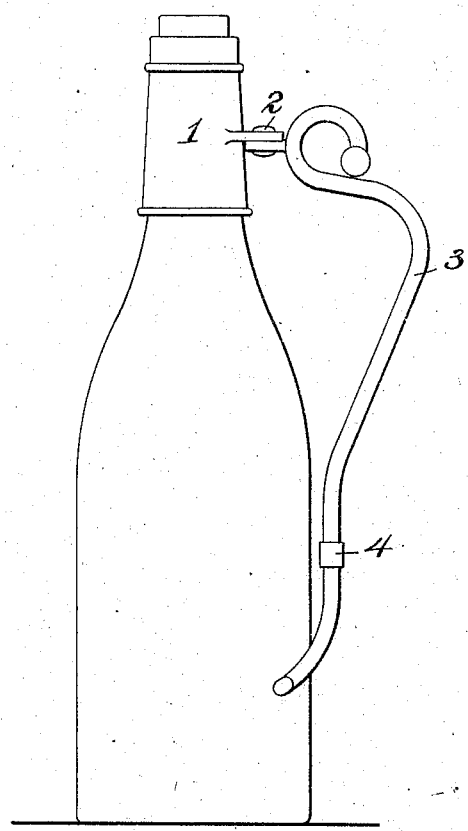
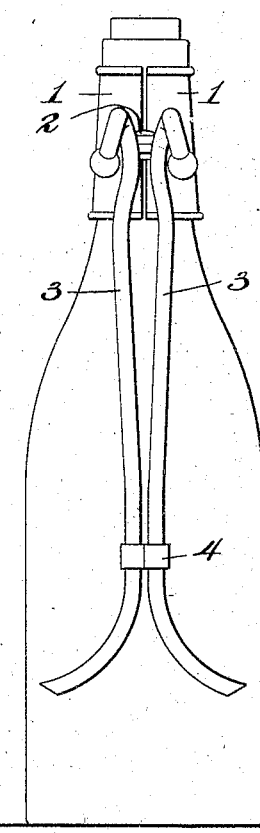
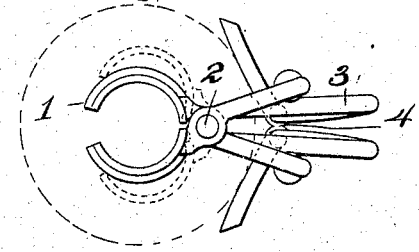
WITNESSES:
INVENTOR
BY
ATTORNEYS No. 791,781.

Patented June 6, 1905.

UNITED STATES PATENT OFFICE.

GUSTAVE A. HENCKEL, OF EAST ORANGE, NEW JERSEY.

HOLDER FOR BOTTLES OR OTHER ARTICLES.

SPECIFICATION forming part of Letters Patent No. 791,781, dated June 6, 1905.

Application filed February 14, 1905. Serial No. 245,624.

*To all whom it may concern:*

Be it known that I, GUSTAVE ADOLPH HENCKEL, a citizen of the United States, residing at East Orange, in the county of Essex and State of New Jersey, have invented certain new and useful Improvements in Holders for Bottles or other Articles; and I do hereby declare the following to be a full, clear, and exact description of the invention, such as will enable others skilled in the art to which it appertains to make and use the same.

My invention relates to improvements in bottle-holders; and it consists in a novel separable handle or holder adapted to be attached to and detached from bottles readily and which is simple, light, graceful in appearance, and is easily used.

The objects of my invention are to facilitate the pouring of liquids from bottles, and particularly from wine-bottles and the like, to avoid proximity of the hand of the person holding the bottle to the mouth thereof, to make the bottle-holder light and graceful in appearance and easy to manufacture, to make the bottle-holder easy of attachment to and detachment from the bottle, to cause the bottle-holder to adapt itself automatically to different sizes of bottle-necks, and generally to make the device simple, durable, reliable, and relatively inexpensive.

I will now proceed to describe my invention with reference to the accompanying drawings, in which one form of bottle-holder embodying my invention is illustrated, and will then point out the novel features thereof in claims.

In the said drawings, Figure 1 shows a side view of a bottle with my holder thereon. Fig. 2 shows a rear elevation of the bottle-holder in place on the bottle. Fig. 3 shows a top view of the holder in place on a bottle and in dotted lines indicates how the holder is applied to and removed from a bottle.

My improved holder for bottles comprises a two-part neck-collar adapted to surround the neck of a bottle and formed in two halves 1 1, hinged together at 2, and also comprises two handles 3 3, each secured at or near its upper end to one of the sections of the neck-collar bent outward from such point of attachment to form a convenient handle and then bent downward. At a convenient point, preferably near their lower ends, these two handles 3 are connected by a bracket 4, in which one of them has a bearing, so that it may turn freely, and below said bracket the two handles flare outward and inward toward the surface of the bottle to be held. These flaring lower portions of the handles serve to steady the device when the same is in use by pressing against the sides of the bottle.

To attach my improved holder to a bottle, the handles 3 are spread apart somewhat, thus causing the sections of the neck-collar 1 1 to spread apart, so that they may be placed about the neck of the bottle. The handles 3 are then brought together, and the neck-collar is thereby caused to grasp the neck of the bottle and hold it securely. It will be obvious that the pressure of the hand grasping the holder by the handles 3 tends to keep said handles together, and therefore to cause the neck-collar to hold the bottle securely. It will also be obvious that the device adapts itself automatically to bottles the size and the shape of the necks of which differ slightly.

To detach the holder from a bottle, the handles 3 are spread apart somewhat, causing the sections of the neck-collar to open, so that the holder may be removed at once from the bottle.

It is obvious that my improved bottle-holder may be made in a variety of different shapes and forms to adapt it for holding bottles of different sizes and types and also for the purpose of producing pleasing variations in the appearance of the device; also, that devices operating on the same principle and substantially similar in construction may be made for holding other articles than bottles, and such devices I regard as within my invention. I do not limit myself, therefore, to the particular details of construction, form, and arrangement of the parts herein illustrated and described.

What I claim is—

1. In a holder of the class described, the combination of a two-part neck-collar and separate handles for the sections thereof, said sections hinged together at a point between the collar and the handles, and each handle secured to the diagonally opposite collar-section, whereby when said handles are pressed together the collar is contracted and when said handles are separated the collar is opened.

2. In a holder of the class described, the combination of a two-part collar and separate handles for the sections thereof, said sections hinged together, and said handles also movably connected at a point distant from the said hinge and flared to engage the object held.

3. In a bottle-holder, the combination of a two-part neck-collar adapted to surround the neck of a bottle, and separate handles for the sections of said collar, said sections hinged together between the collar and said handles and each handle secured to the diagonally opposite collar-section, said handles movably secured together below the collar, and flared outwardly below such point of connection and arranged to bear against the lower portion of the bottle.

In testimony whereof I affix my signature in the presence of two witnesses.

GUSTAVE A. HENCKEL.

Witnesses:
  H. M. MARBLE,
  L. S. ANDREWS, Jr.